US008657096B2

(12) United States Patent
Hsieh

(10) Patent No.: US 8,657,096 B2
(45) Date of Patent: Feb. 25, 2014

(54) DOOR MACHINE HAVING CHAIN DISK LOCKING MECHANISM

(76) Inventor: Chung Hsien Hsieh, New Taipei (TW)

( * ) Notice: Subject to any disclaimer, the term of this patent is extended or adjusted under 35 U.S.C. 154(b) by 125 days.

(21) Appl. No.: 13/354,368

(22) Filed: Jan. 20, 2012

(65) Prior Publication Data

US 2013/0074409 A1 Mar. 28, 2013

(30) Foreign Application Priority Data

Sep. 26, 2011 (TW) ............................ 100134526 A

(51) Int. Cl.
*E06B 9/74* (2006.01)
*E06B 9/56* (2006.01)
*F16D 55/22* (2006.01)

(52) U.S. Cl.
USPC ........... 192/223.2; 192/226; 74/625; 188/171

(58) Field of Classification Search
USPC ............................................... 192/223.2, 226
See application file for complete search history.

(56) References Cited

U.S. PATENT DOCUMENTS 2,583,428 A * 1/1952 Houplain .................. 192/223.2
7,341,129 B2 3/2008 Hsieh
7,686,150 B2 3/2010 Hsieh
2010/0132505 A1* 6/2010 Hsieh .............................. 74/625

* cited by examiner

*Primary Examiner* — David D Le
*Assistant Examiner* — Mark Manley
(74) *Attorney, Agent, or Firm* — Bacon & Thomas, PLLC

(57) ABSTRACT

A door machine having an electric motor and a chain disk locking mechanism. The chain disk locking mechanism includes a chain disk, an engaging rotary block, a stationary shaft and a plurality of moving pins. When the chain disk is pulled to rotate, the fixed pins of the chain disk press the moving pins so as to push the engaging rotary block to rotate with the stationary shaft together. When the stationary shaft is pulled to rotate, the engaging rotary block prohibits the moving pins from rotation. When the chain disk is pulled manually, the rolling door can be rolled upward or downward; when cease pulling the chain disk, braking is immediately effected so as to prevent the rolling door from moving upward or downward. Hence, the clutch mechanism can be omitted for cost saving and the structure of the mechanism can be simplified.

6 Claims, 8 Drawing Sheets

DOOR MACHINE HAVING CHAIN DISK LOCKING MECHANISM

BACKGROUND OF THE INVENTION

1. Field of the Invention

This invention relates to a door machine having a chain disk locking mechanism, more particularly to an electric rolling door having a feature of opening/shutting in high speed, which is suitable for warehouse or garage needing frequent opening/shutting.

2. Description of the Related Art

Accompanying with the rising of Environment Protection and energy saving consciousness, for example, of avoiding cold air or warm air from leaking to outside, the opening/shutting of electric rolling door used for ordinary warehouse or garage becomes very frequent. Frequent opening/shutting may cause shorter lifetime of the rolling door. Further, in order to prevent cold/warm air from leaking to outside, there is a demand to increase the running speed of the electric rolling door.

Conventional electric door machine has a clutch which switches between the motor driven rolling and manual chain disk rolling. However, the clutch mechanism is complicated in structure and very expensive, what is more, the chances of failure are high. When the conventional electric door machine 1 as shown in FIG. 1 is in the condition of power blackout or failure in electric motor, manual operation of pulling the chain disk has to be conducted for door opening/shutting. Firstly, the switching chain 11 has to be pulled so as to change over the clutch (not shown in figure), and the chain 10 is pulled at the same time. In this manner, the rolling door can be rolled upward/downward by pulling the chain 10.

Thus it is an urgent demand to develop an electric door machine, which is easy in operation, speedy in rolling upward/downward, long lifespan, simple in structure, low-cost, and which may be switched between electric or manual modes without using a clutch mechanism.

SUMMARY OF THE INVENTION

The main object of the present invention is to provide an electric door machine having a chain disk locking mechanism which not only dispenses with clutch mechanism used in conventional door machine so as to reduce cost, but also has simplified mechanical components and its assembly and convenience in maintenance so as to extend life span of service. Further, when the chain disk of the present invention is operated, for example by pulling manually, the rolling door is rolled upward/downward; when cease pulling the chain, braking is immediately effected so as to lock the rolling door from moving upward/downward. Thus, switching operation by a conventional clutch is not required.

Another object of the present invention is to provide an electric door machine having a chain disk locking mechanism which can increase/decrease the number of the brake disk and the brake wheel arranged with great flexibility according to the practical demand, such as the horsepower of the electric motor, the weight of the rolling door, or some other factors, so as to adjust the brake force.

In order to achieve above and other objects, the electric door machine mainly comprises an electric motor and a chain disk locking mechanism, the electric motor including a drive shaft; the chain disk locking mechanism including a chain disk, an engaging rotary block, a stationary shaft and a plurality of moving pins. The chain disk comprises a chain wheel, a wall disk, a holder and a plurality of fixed pins. The wall disk is fastened to one side surface of the chain wheel, a central axial hole being provided on the wall disk. The chain wheel includes a central opening in which the holder is received freely, and the holder is fixed to an outer casing to define with the wall disk a central circular bore. The plural fixed pins are positioned axially within the central circular bore and are fixed on the wall disk. The engaging rotary block is received within the central circular bore, and the engaging rotary block includes a plurality of axial slots that correspond to the plural fixed pins in number. Each axial slot includes one first end face and two second end faces, and the two second end faces are respectively provided at both sides of the first end face, the first end face and an inner wall of the central circular bore are spaced apart by a first radial gap and the second end face and the inner wall of the central circular bore are spaced apart by a second radial gap, the first radial gap is narrower than the second radial gap.

Further, one end of the stationary shaft is rotatably coupled to the drive shaft of the electric motor and the other end of which passes through the axial hole of said chain disk and is fixed to the engaging rotary block. A plurality of moving pins are respectively received within the plural axial slots and are located between the second end faces and the inner wall of the central circular bore. The diameter of each moving pin is bigger than the first radial gap but smaller than the second radial gap, while the diameter of each fixed pin is smaller than the first radial gap. When the chain disk is rotated, the fixed pins press the moving pins so as to push the engaging rotary block to rotate and to cause the stationary shaft to rotate. When the stationary shaft is about to rotate, the moving pins is engaged between the first end face of the engaging rotary block and the inner walls of the central circular bore, so the stationary shaft is prohibited from rotating.

Preferably, each axial slot includes two end walls disposed respectively on both sides of the axial slot and are adjacent to the two second end faces. Each end wall is provided with a compression spring which force the moving pins to disengage from the end walls. In this manner, the compression springs can push the multiple moving pins to contact the first end face so that the moving pins are engaged in the first radial gap to lock the stationary shaft. The present invention may further comprise a reduction mechanism coupling to the drive shaft of the electric motor for reducing the output speed of the electric motor. The reduction mechanism is intended to cooperate with the rolling door to control the rolling upward/downward speed of the rolling door. Hence, the reduction mechanism may be installed when necessary, and the degree of reduction provided by the reduction mechanism can be adjusted according to practical demand.

Furthermore, this invention comprises an electromagnetic brake module which includes a brake disk, an electromagnetic force generator, and an elastic element, one end of the drive shaft being connected with an end disk, wherein the brake disk and the elastic element are fitted on the stationary shaft, and the brake disk is located at one side surface of the end disk, and the elastic element forces the brake disk to press against the end disk so as to effect braking. When the electric motor is activated, the electromagnetic force generator is energized to disengage the brake disk from the end disk to release the drive shaft. Therefore, when the electric motor is in non-operation state, the drive shaft of the electric motor is locked by the chain disk locking mechanism so that the drive shaft cannot be rotated freely. Besides, the stationary shaft may also be braked by the electromagnetic brake module so that the drive shaft of the electric motor cannot be rotated freely. Hence, double braking effect can be achieved.

Further, the end disk is connected to a brake wheel in axial direction, while the brake disk is located between the end disk and the brake wheel. Further, the electromagnetic force generator may comprise a shaft disk which is fitted on the stationary shaft and is located between the electromagnetic force generator and brake wheel. Furthermore, the elastic element can force the shaft disk and the brake disk to press against the brake wheel and the end disk to effect braking. When the electric motor is activated, the electromagnetic force generator is energized to attract the shaft disk so that the shaft disk linking the brake disk is disengaged from the end disk and the brake wheel to release the drive shaft. In this manner, the present invention can provide additional brake wheel to increase the brake force. In other words, this invention can increase or decrease the quantities of the brake disk and the brake wheel arranged with great flexibility according to the practical demand such as the horsepower of the electric motor, the weight of the rolling door, or some other factors, so as to adjust the brake force.

Further, the brake wheel is coaxially connected to the end disk and is arranged to be slidable relative to the end disk. A plurality of linings are provided on both side surfaces of the brake disk and the surface of the shaft disk facing the brake disk. Wherein, the elastic element forces the end disk, the shaft disk, the brake wheel and the brake disk to be stacked together so that the plural linings contact with the end disk and the brake wheel to render braking. In this manner, the present invention can contact and brake the end disk and the brake wheel by the plural linings. Further, the brake disk and the shaft disk have each has an axial leaf spring through which said brake disk and shaft disk are disposed on the stationary shaft. These axial leaf springs provide pre-deformation force which may force the brake disk and the shaft disk to disengage from the end disk. That is to say, the brake disk and the shaft disk are disengaged from the end disk and the brake wheel with the aid of the pre-deformation force of the axial leaf springs. In other words, when the electric motor is not in operation, the elastic force of the elastic element is bigger than the pre-deformation force so that the elastic element forces the brake disk and the shaft disk to contact and to brake the end disk and the brake wheel; when the electric motor starts to rotate, the magnetic attraction force produced by the electromagnetic force generator overwhelms the elastic force of the elastic element so that the pre-deformation force forces the brake disk and the shaft disk to disengage automatically from the end disk and the brake wheel.

Further, the outer casing of the present invention includes a rear cover and an outer enclosure. The holder is fixed to the rear cover; the electromagnetic brake module and the chain disk locking mechanism are accommodated in the outer enclosure. Further, the present invention includes a brake release mechanism which is also received in the outer casing. The brake release mechanism comprises a release lever, an active bracket, a release disk, a fixed bracket, and a fixed bush. The fixed bracket is fixed on the outer casing, while the active bracket is attached to the fixed bracket and is connected to the release disk with the fixed bracket. The release disk is fitted on the shaft disk, and the fixed bush is fitted on the stationary shaft. One end of the release lever is hinged at the fixed bush and is adjacent to the active bracket. When the release lever is shifted, the release lever drives the active bracket so that the shaft disk and the brake disk are disengaged from the end disk and the brake wheel. In this manner, when the present invention is under special usage condition such as opening/shutting in power blackout condition or installation test running, the release lever is shifted to release the end disk and the brake wheel so that the drive shaft of the electric motor is disengaged from the stationary shaft and the rolling door is rolled downward.

DETAILED DESCRIPTION OF PREFERRED EMBODIMENTS

Figure 1:
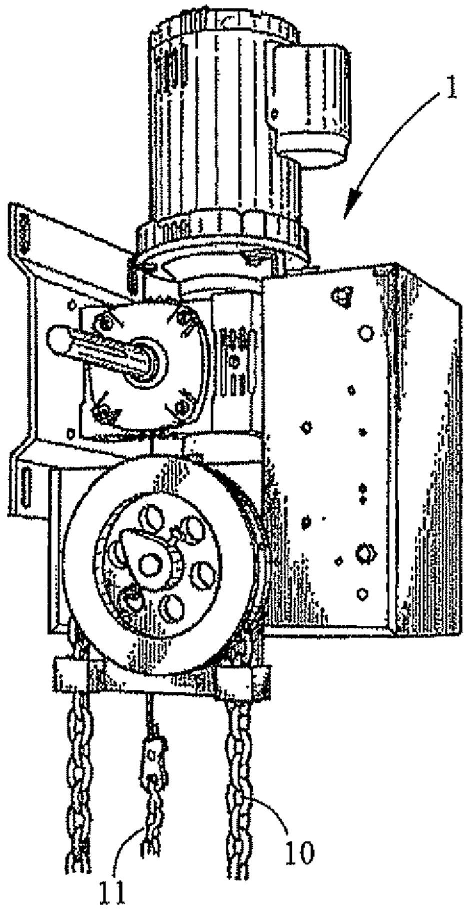
FIG. 1 is a perspective view of a conventional electric door machine.
Figure 2:
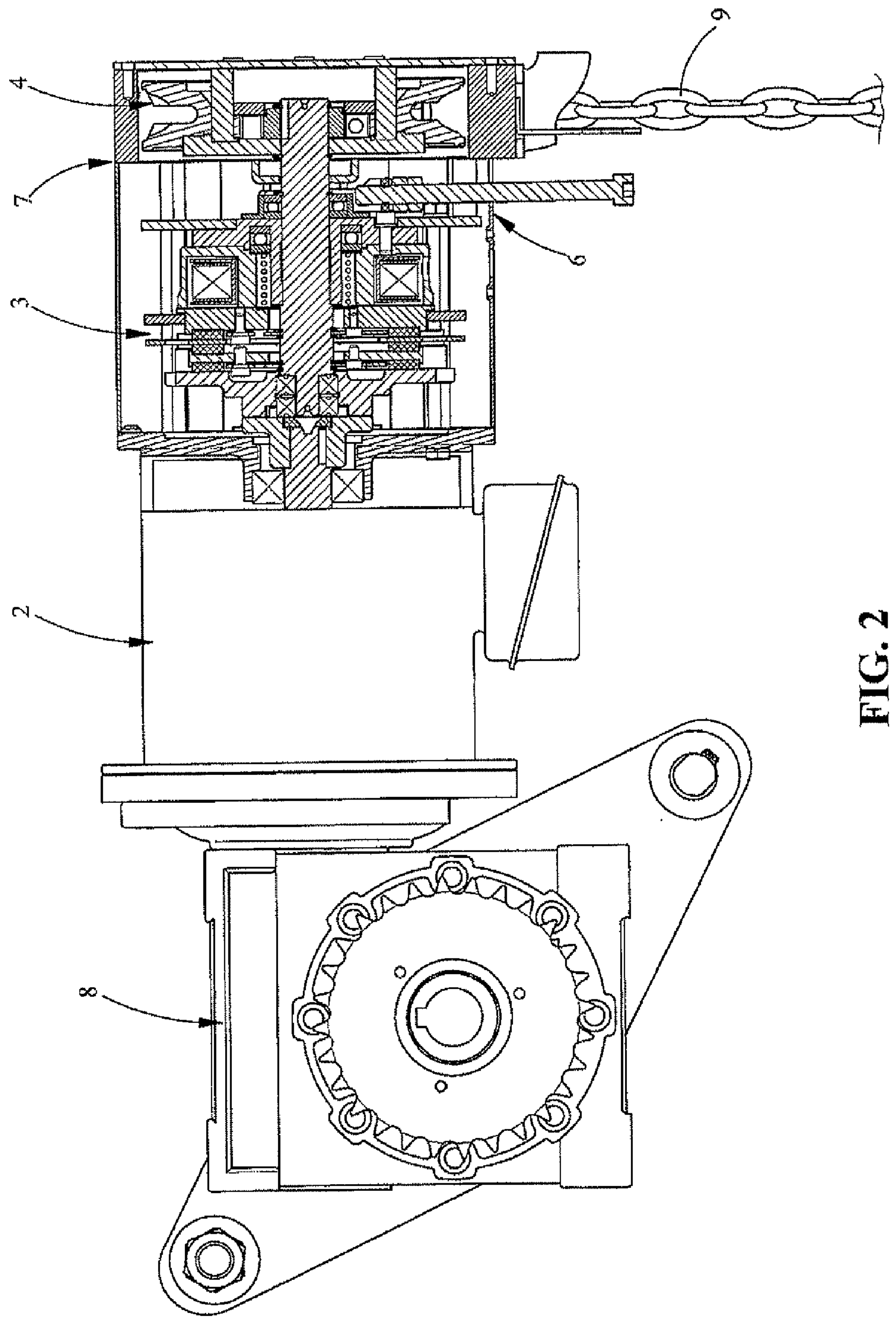
FIG. 2 is a schematic view showing a preferred embodiment of the electric door machine of the present invention.

FIG. 2 is a schematic view showing a preferred embodiment of the electric door machine of the present invention. As shown in FIG. 2, the electric door machine comprises an electric motor 2, an electromagnetic brake module 3, a chain disk locking mechanism 4, a brake release mechanism 6, an outer casing 7, and a reduction mechanism 8. The electromagnetic brake module 3, the chain disk locking mechanism 4, and the brake release mechanism 6 are accommodated in the outer casing 7. The outer casing 7 enclosing the aforementioned mechanisms is connected at one side of the electric motor 2, and the reduction mechanism 8 connected at the other side. The reduction mechanism 8 may reduce the output speed of the electric motor 2 for moving the rolling door (not shown). In other words, the reduction mechanism 8 is designed to control the upward/downward rolling speed of the rolling door. The degree of reduction provided by the reduction mechanism 8 can be adjusted according to practical demand.

Figure 3:
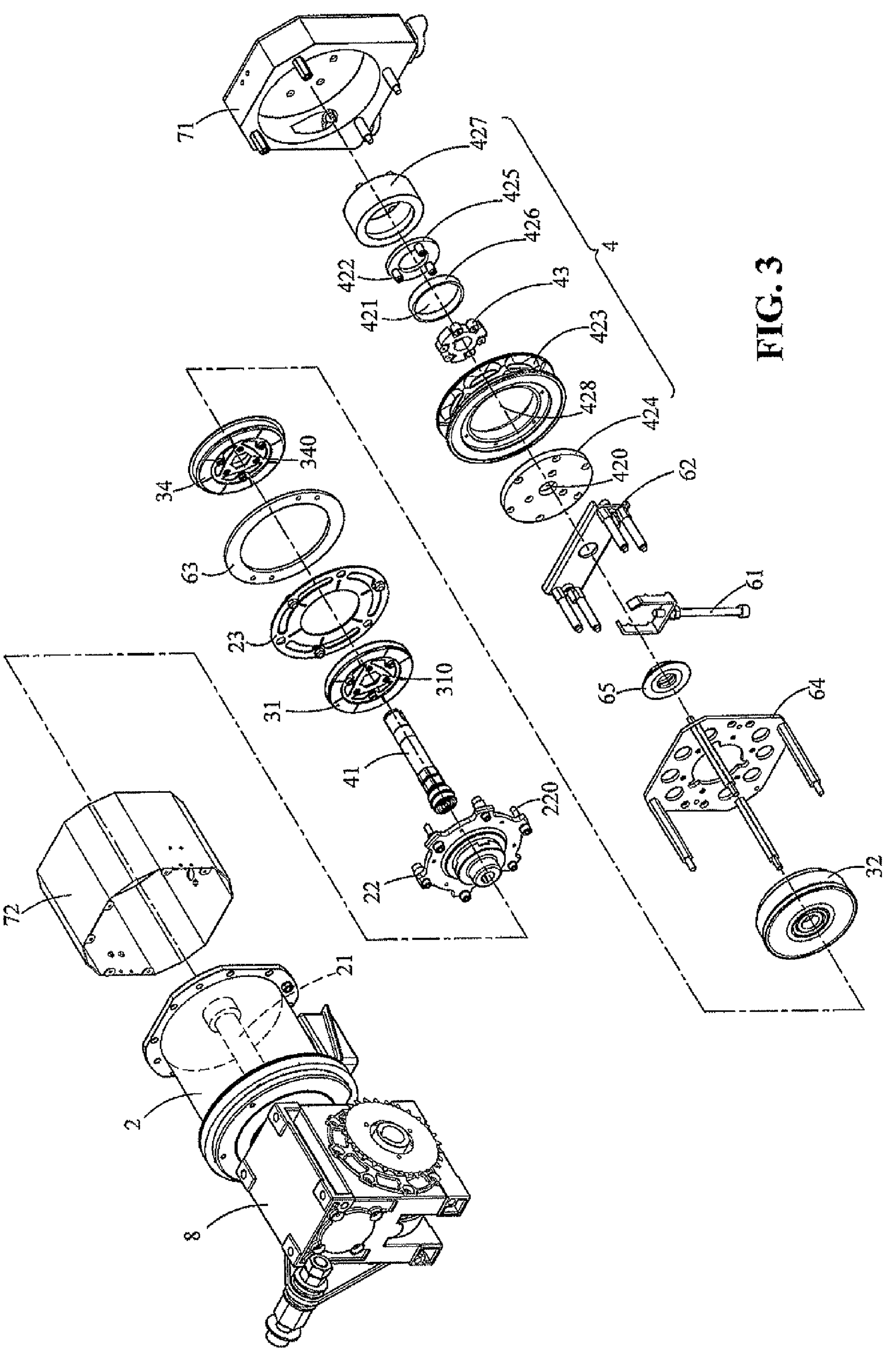
FIG. 3 is an exploded view showing a preferred embodiment of the electric door machine of the present invention.
Figure 4:
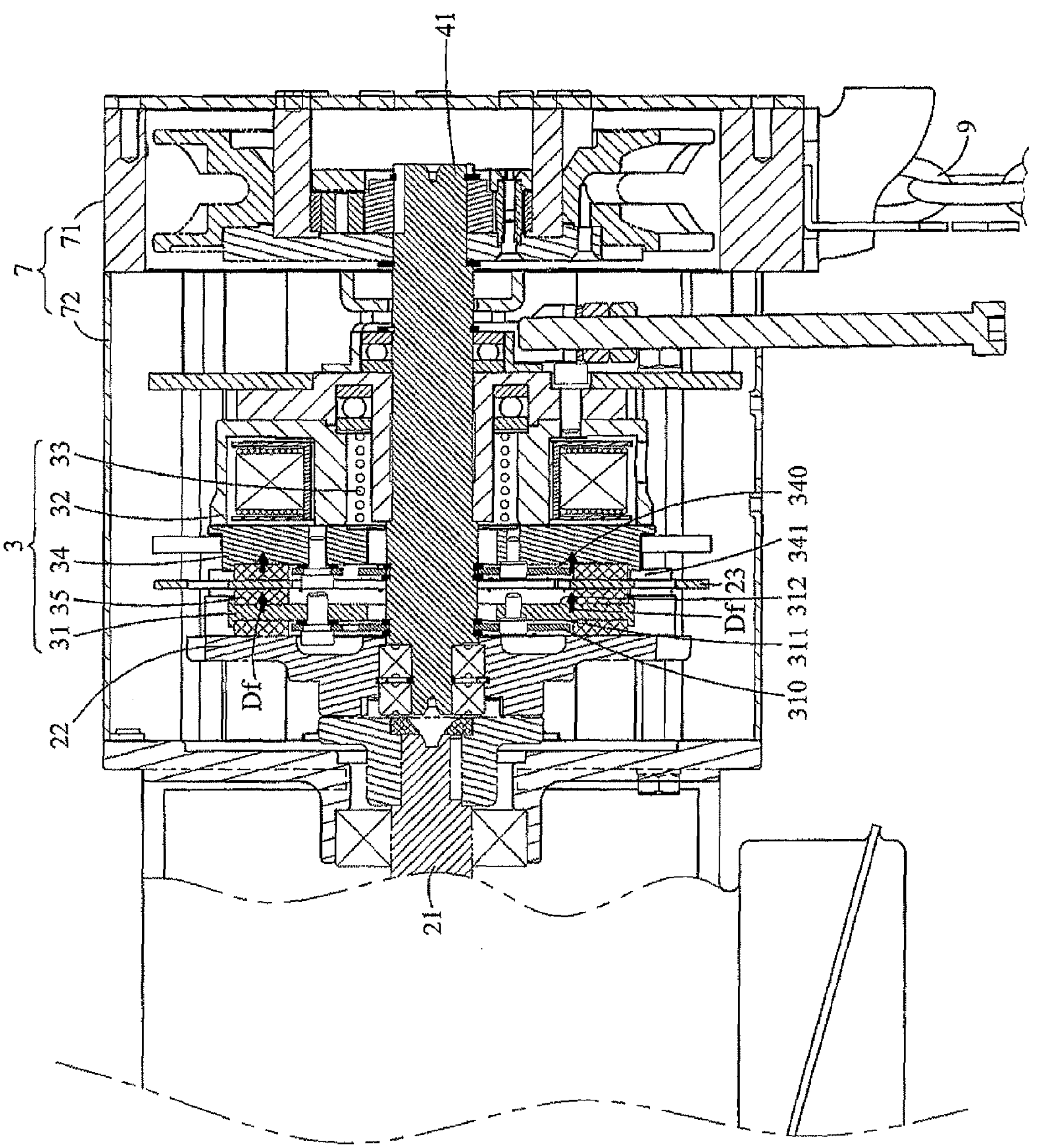
FIG. 4 is a partial sectional view showing a preferred embodiment of the electric door machine of the present invention.

FIG. 3 is an exploded view of the electric door machine according to a preferred embodiment of the present invention, and FIG. 4 is a partial sectional view of the electric door machine. As shown in the figures, the outer casing 7 includes a rear cover 71 and an outer enclosure 72. The electric motor 2 includes a drive shaft 21 having one end connected to an end disk 22. The end disk 22 is pivotally and coaxially connected to a stationary shaft 41. Further, the electromagnetic brake module 3 includes a brake disk 31, an electromagnetic force generator 32, an elastic element 33, a shaft disk 34, and a plurality of linings 35. The brake disk 31, the electromagnetic force generator 32, the elastic element 33, and the shaft disk 34 are disposed on the stationary shaft 41, while the linings 35 are disposed on the surfaces 311, 312 of both sides of the brake disk 31 and on the surface 341 of the shaft disk 34 facing the brake wheel 23.

Further as shown in the figures, the brake disk 31 and the shaft disk 34 respectively include axial leaf springs 310, 340 so as to be fitted on the stationary shaft 41 through the axial leaf springs 310, 340. The axial leaf springs 310, 340 respectively provide a pre-deformation force Df which urges the brake disk 31 and the shaft disk 34 to disengage from the end disk 22. In other words, when no external force is applied, the axial leaf springs 310, 340 tend to force the brake disk 31 and the shaft disk 34 to deflect toward the electromagnetic force generator 32.

Further, the end disk 22 is axially connected to a brake wheel 23. The brake disk 31 is located between the end disk 22 and the brake wheel 23, while the shaft disk 34 is located between the electromagnetic force generator 32 and brake wheel 23. The end disk 22 is attached coaxially to the brake wheel 23 by means of six axial pins 220 thereon, and is arranged to be slidable relative to the brake wheel 23. The number of the brake disk 31 and the brake wheel 23 can be increased or decreased according to practical demand. For example, the quantities of the brake disk 31 and the brake wheel 23 can be changed depending on the horsepower of the electric motor 1, the weight of the rolling door, or some other factors, so as to adjust the brake force.

The elastic element 33 provides an elastic pre-deformation force which forces the end disk 22, the shaft disk 34, the brake wheel 23 and the brake disk 31 to be stacked together so that the multiple linings 35 engage the end disk 22 and the brake wheel 23 to immobilize the drive shaft 21 and the stationary shaft 41, thereby effecting the braking effect. When the electric motor 2 is activated, the electromagnetic force generator 32 is energized to attract the shaft disk 34 so that the shaft disk 34 linking with the brake disk 31 is disengaged from the end disk 22 and the brake wheel 23. The drive shaft 21 is then free to rotate.

Figure 5A:
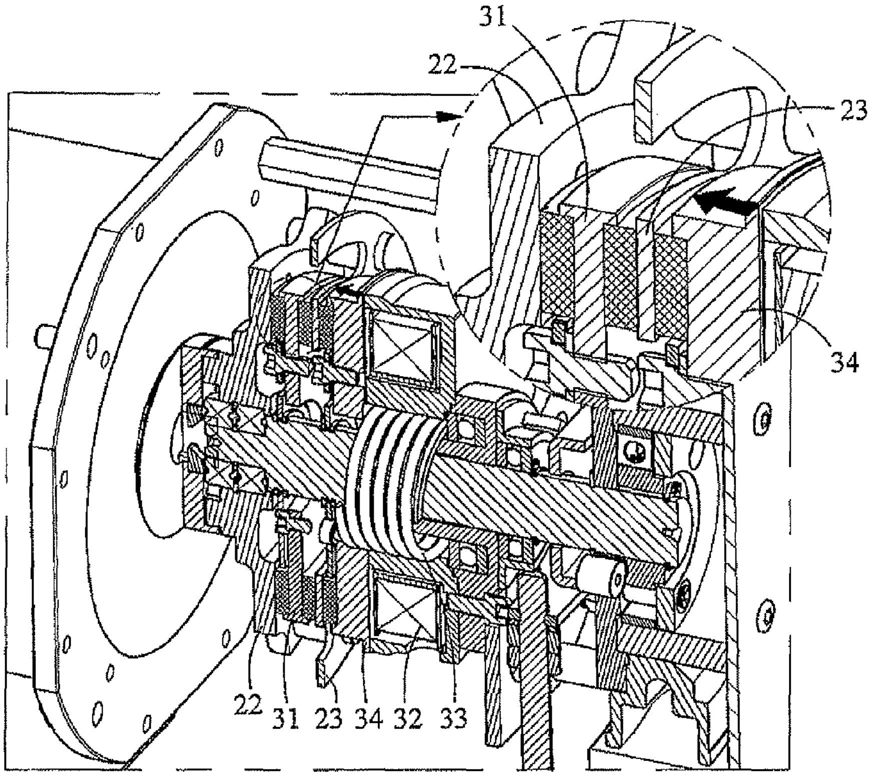
FIG. 5A is a sectional view showing the braking state of the electromagnetic brake module of a preferred embodiment of the present invention.
Figure 5B:
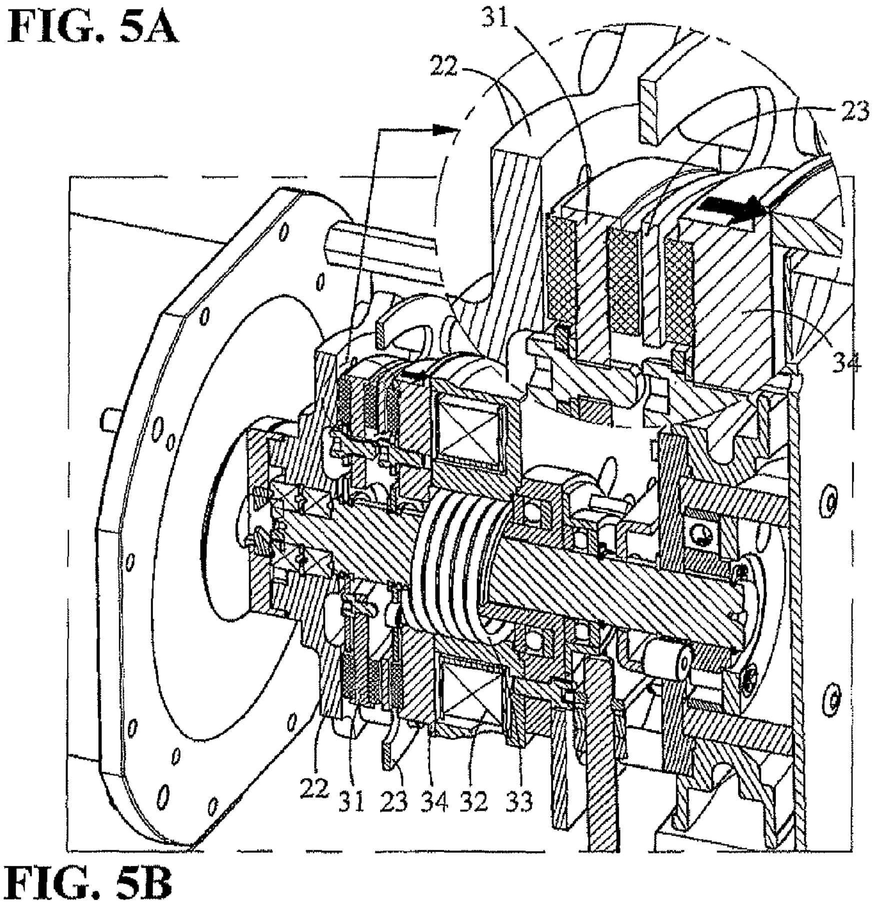
FIG. 5B is a sectional view showing the releasing state of the electromagnetic brake module of a preferred embodiment of the present invention.

FIG. 5A is a sectional view showing the braking state of the electromagnetic brake module of the present invention. FIG. 5B is a sectional view showing the releasing state of the electromagnetic brake module. The operation of the electromagnetic brake module is now described with reference to FIGS. 5A and 5B. When the electric motor 2 is not in operation, as the elastic force of the elastic element 33 is greater than the pre-deformation force Df of the leaf springs 310, 340, the elastic element 33 forces the brake disk 31 to engage the shaft disk 34 so as to brake the end disk 22 and the brake wheel 23. On the other hand, when the electric motor 2 is in operation, the electromagnetic force generator 32 is energized to produce a magnetic attraction force that may resist the elastic force of the elastic element 22 and attract the shaft disk 34. The pre-deformation force Df of the axial leaf springs 310, 340 forces the brake disk 31 and the shaft disk 34 to disengage from the end disk 22 and the brake wheel 23.

Figure 6:
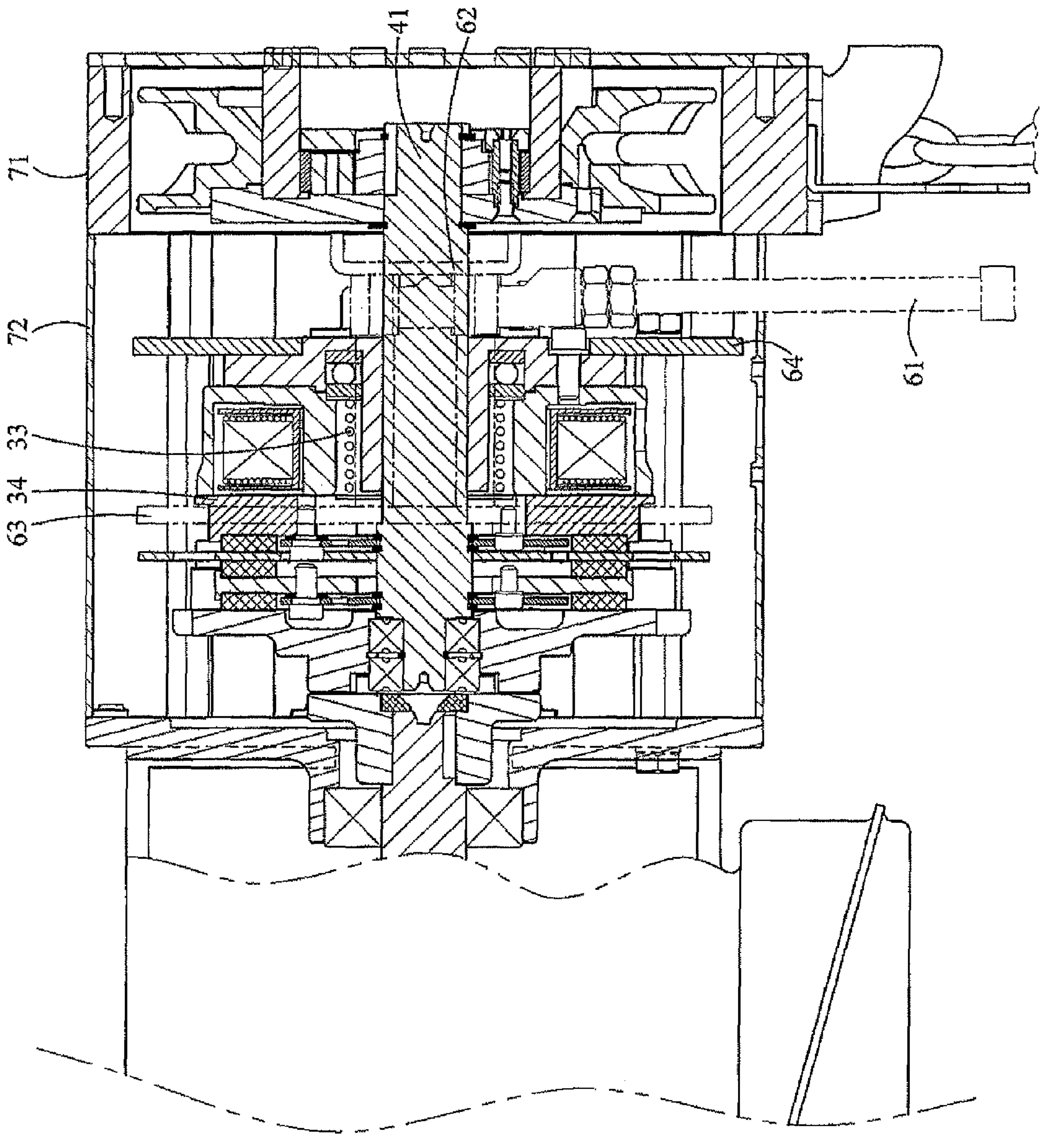
FIG. 6 is another partial sectional view showing a preferred embodiment of the electric door machine of the present invention.

With reference to FIG. 3 and FIG. 6 which is a further partial sectional view of the electric door machine according to the present invention. As shown in the figures, the brake release mechanism 6 includes a release lever 61, an active bracket 62, a release disk 63, a fixed bracket 64, and a fixed bush 65. The fixed bracket 64 is fixed on the outer enclosure 72. The active bracket 62 is attached to the fixed bracket 64 and connected to the release disk 63 therewith. The release disk 63 is fitted on the shaft disk 34, and the fixed bush 65 is mounted on the stationary shaft 41 by allowing the shaft 41 to pass therethough. One end of the release lever 61 is hinged at the fixed bush 65 and is adjacent to the active bracket 62.

Figure 7:
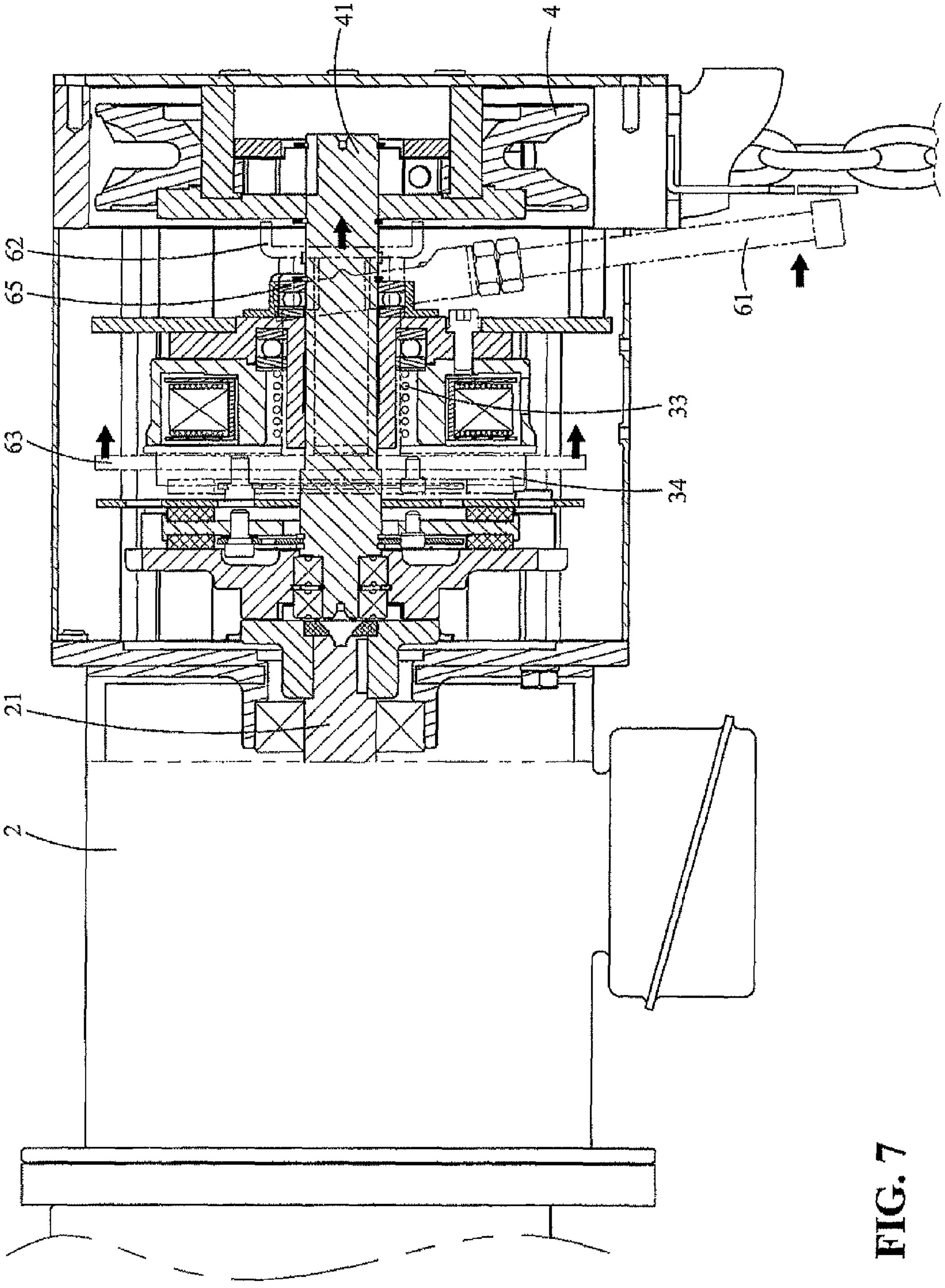
FIG. 7 is a schematic view showing the state of shifting the release lever of a preferred embodiment of the present invention.

FIG. 7 is a schematic view showing the release lever 61 under the state of being shifted. As shown in the figure, when the release lever 61 is shifted to the position as illustrated in dash lines, the release lever 61 urges the active bracket 62 to move towards the chain wheel locking mechanism 4. At this moment, the active bracket 62 carries the release disk 63 to move synchronously, and push the shaft disk 34 to urge against the elastic element 33 simultaneously. In this manner, the shaft disk 34 and the brake disk 31 are disengaged from the end disk 22 and the brake wheel 23. The operation and the effect is similar to those resulted from the attraction of the shaft disk 34 by the electromagnetic force generator 32 in actuating state as described hereinbefore. When it is desired to shut the rolling door or to make a running test of the rolling door, shift the release lever 61 to release the end disk 22 and the brake wheel 23, and the drive shaft 21 of the electric motor 2 will be disengaged from the stationary shaft 41 and the rolling door rolled downward by its own weight.

Figure 8C:
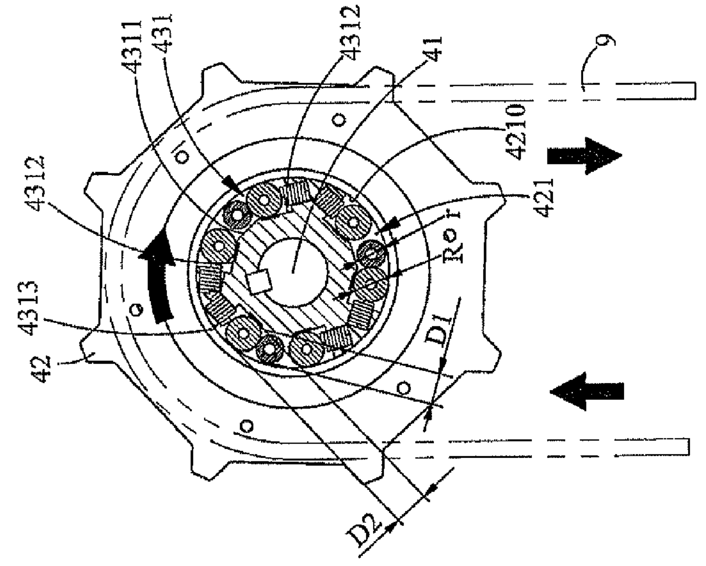
FIG. 8C is a schematic view showing the operation of the chain wheel locking mechanism of a preferred embodiment of the present invention.
Figure 8B:
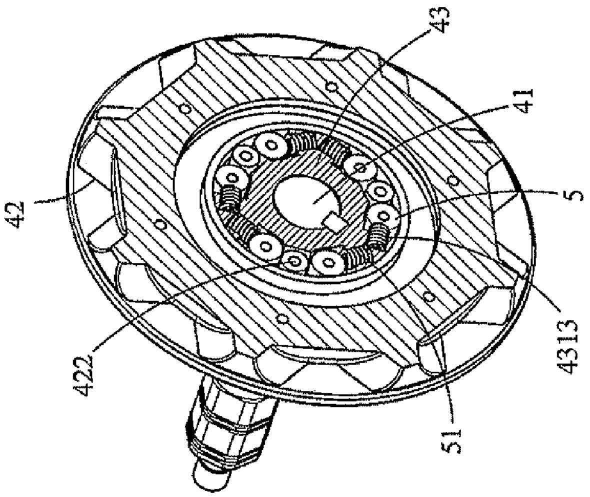
FIG. 8B is a sectional view showing the chain wheel locking mechanism of a preferred embodiment of the present invention.
Figure 8A:
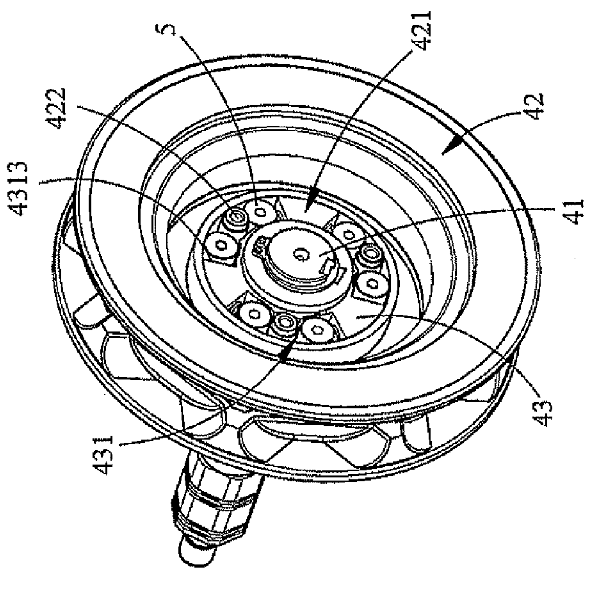
FIG. 8A is an exploded view showing the electric door machine of a preferred embodiment of the present invention.

With reference to FIGS. 3, 8A, 8B and 8C, in which FIG. 8A is an exploded view of the electric door machine according to the present invention; FIG. 8B is a sectional view showing the chain wheel locking mechanism of the present invention; and FIG. 8C is a schematic view showing the operation of the chain wheel locking mechanism. As shown in the figures, the chain wheel locking mechanism 4 in this embodiment comprises a chain disk 42, an engaging rotary block 43, and six moving pins 5. The chain disk 42 includes a chain wheel 423, a wall disk 424, a fixed seat 425, a sleeve 426, and a holder 427.

Further, an axial hole 420 is provided at the center of the wall disk 424 which is fixed to one side of the chain wheel 423. The chain wheel 423 includes an opening 428 at the center. In an alternative embodiment, the wall disk 424 can be omitted and instead, the brake wheel 423 having a side wall can be directly employed. The wall disk 424 provided in this embodiment is for the sake of convenient assembly. The holder 427 is received in the opening 428 of the chain wheel 423 and attached to the rear cover 71 along with the chain wheel 423. By such arrangement, the chain wheel 423 can be rotated freely relative to the holder 427. The wall disk 426 is fixed in the holder 427 to define with the wall disk 424 a central circular bore 421. Furthermore, three equally spaced fixed pins 422 are formed along the circumference of the fixed seat 425 and protrude axially therefrom. The fixed seat 425 is attached to the wall disk 424.

The engaging rotary block 43 is received in the central circular bore 421, and comprises three equally spaced axial slots 431. Each axial slot 431 includes a first end face 4311, two second end faces 4312 and two end walls 4313. The two second end faces 4312 are disposed respectively on both sides of the first end face 4311. The two end walls 4313 are disposed respectively on both sides of the two second end faces 4312 to define an axial slot 431. The first end face 4311 and an inner wall 4210 of the central circular bore 421 are spaced apart by a first radial gap D1. The second end face 4312 and the inner wall 4210 of the central circular bore 421 are spaced apart by a second radial gap D2. The first radial gap D1 is narrower than the second radial gap D2.

The diameter R of each moving pin 5 is bigger than the first radial gap D1 but is smaller than the second radial gap D2. The diameter of each fixed pin 422 is smaller than the first radial gap D1. Therefore, each fixed pin 422 can move freely within the axial slot 431, i.e., move to urge against the first end face 4311 and the second end faces 4312. On the other hand, each moving pin 5 is restricted by the first radial gap D1 and can only move to urge against the second end face 4312.

As shown in the figures, one end of the stationary shaft 41 is coupled to the drive shaft 21 of the electric motor 2, and the other end passes through the axial hole 420 of the wall disk 424 and is fixedly attached to the engaging rotary block 43. Each of the six moving pins 5 is received in respective axial slots 431, and is positioned between the second end faces 4312 and the inner walls 4210 of the central circular bore 421. The end walls 4313 at both sides of each axial slot 431 are provided with compression springs 51 which force the six moving pins 5 to move away from the end walls 4313. In other words, the six moving pins 5 are forced to approach and contact the first end face 4311 by the compression springs 51 so that the six moving pins 5 are engaged in the first radial gap D1 so as to lock the stationary shaft 41.

The operation of the chain disk locking mechanism 4 of this embodiment will be described below. When chain 9 is pulled to rotate the chain disk 42, the three fixed pins 422 rotate along with the chain disk 42 are biased against the moving pins 5 in the direction of rotation. The moving pins 5 then push the engaging rotary block 43 to cause the stationary shaft 41 to rotate. At this instant, the shaft disk 34, the brake wheel 23, the brake disk 31, the end disk 22 and the drive shaft 21 of the electric motor 2 rotate synchronously so as to roll the rolling door (not shown) upward/downward. On the contrary, when the stationary shaft 41 is inclined to rotate, the moving pins 5 in the direction of rotation will be engaged between the first end face 4311 of the engaging rotary block 43 and the inner walls 4210 of the central circular bore 421, thus prohibiting the stationary shaft 41 from rotating.

In this manner, the present invention omits the clutch mechanism of conventional door machine. The present invention integrates the chain disk and the locking mechanism to provide a brake locking effect to prevent the rolling door from rolling downward automatically or rolling upward easily under power blackout condition. In other words, when the chain disk locking mechanism 4 is in operation, for example the chain disk 42 is pulled manually to rotate, the rolling door will be rolled upward/downward. When cease pulling the chain disk, braking is effected at once to lock the rolling door from rolling upward/downward. Thus, switching operation conducted by conventional clutch mechanism is not required. Furthermore, this invention can be adapted to a door machine that operates under high speed and needs frequent switching. The structure is very simple and the lifetime of service can be significantly increased. It is verified that the present invention may be switch on/off for at least 300,000 times.

While the present invention has been described and illustrated by the above embodiments and accompanying drawings, it is to be understood that this invention is not limited to these embodiments. The scope of this invention is defined by the appended claims.

What is claimed is:

1. An electric door machine comprising a chain disk locking mechanism, an electromagnetic brake module, and an electric motor having a drive shaft, wherein:

said electromagnetic brake module comprising a stationary shaft, an end disk, a brake disk, an electromagnetic force generator, and an elastic element; a first end of said stationary shaft being coupled to said drive shaft of said electric motor, said end disk being connected to said first end of said stationary shaft; said brake disk, said electromagnetic force generator, and said elastic element being fitted on said stationary shaft, said brake disk being located at one side of said end disk, said elastic element drives said brake disk to press against said end disk to effect braking; when said electric motor is activated, said electromagnetic force generator is energized to disengage said brake disk from said end disk, to thereby releasing said drive shaft;

said end disk being connected axially with a brake wheel, said brake disk being located between said end disk and said brake wheel, said electromagnetic brake module further comprising a shaft disk fitted on said stationary shaft and located between said electromagnetic force generator and said brake disk; said elastic element drives said shaft disk and said brake disk to press against said brake wheel and said end disk to effect braking; when said electric motor is activated, said electromagnetic force generator is energized to attract said shaft disk so as to disengage said shaft disk and said brake disk disengaged from said end disk and said brake wheel, to thereby releasing said drive shaft;

said brake wheel being attached to said end disk coaxially and slidable relative to said end disk, a plurality of linings being provided on both side surfaces of said brake disk and a surface of said shaft disk facing said brake disk; said elastic element drives said end disk, said shaft disk, said brake wheel and said brake disk to stack together so that said linings contact said end disk and said brake wheel to effect braking;

said brake disk and said shaft disk each having an axial leaf spring through which said brake disk and shaft disk are disposed on said stationary shaft, each leaf spring has a pre-deformation force for forcing said brake disk and said shaft disk to disengage from said end disk;

said chain disk locking mechanism comprising a chain disk, an engaging rotary block, and a plurality of moving pins; said chain disk having a chain wheel, a wall disk, a holder, and a plurality of fixed pins, said wall disk having an axial hole at the center portion and being fastened on one side surface of said chain wheel, said chain wheel having a central opening for receiving said holder, said holder being fixedly connected to an outer casing to define with said wall disk a central circular bore, said plurality of fixed pins being axially positioned within said central circular bore and being fixed on said wall disk;

said engaging rotary block being received within said central circular bore and connected to a second end of said stationary shaft, and having a plurality of axial slots corresponding to said plurality of fixed pins in number; each axial slot including a first end face and two second end faces with said two second end faces respectively disposed at both sides of said first end face, said first end face and an inner wall of said central circular bore being spaced apart by a first gap; said second end faces and the inner wall of said central circular bore being spaced apart by a second gap, and said first gap being narrower than said second gap;

each of said plurality of moving pins being received within each of said plurality of axial slots, and is positioned between one of said second end face and said inner wall of said central circular bore; wherein:

a diameter of each said moving pin is bigger than said first gap but smaller than said second gap; the diameter of each said fixed pin being smaller than said first gap; when said chain disk is rotated, said fixed pins bias against said moving pins to push said engaging rotary block to rotate and to cause said stationary shaft to rotate; when said stationary shaft is about to rotate, said moving pins is engaged between said first end face of said engaging rotary block and said inner walls of said central circular bore, whereby said stationary shaft is prevented from rotating.

2. The electric door machine as claimed in claim 1, wherein each of said axial slots includes two end walls formed respectively at both sides of each axial slot and are in proximity to said second end face, each of said end walls being provided with a compression spring arranged to force said moving pins to move away from said end wall.

3. The electric door machine as claimed in claim 1, wherein said outer casing includes a rear cover and an outer enclosure, said holder of said chain disk being attached to said rear cover, said electromagnetic brake module and said chain disk locking mechanism being accommodated in said outer enclosure.

4. The electric door machine as claimed in claim 1, further comprising a brake release mechanism accommodated in said outer casing, said brake release mechanism having a release lever, an active bracket, a release disk, a fixed bracket, and a fixed bush, said fixed bracket being fixed on said outer casing, said active bracket being attached to said fixed bracket and connected to said release disk therewith; said release disk being fitted on said shaft disk, said fixed bush being mounted on said stationary shaft, one end of said release lever being hinged at said fixed bush and being adjacent to said active bracket; when said release lever is shifted, said release lever drives said active bracket to render said release disk to press against said shaft disk so as to disengage said shaft disk and said brake disk from said end disk and said brake wheel.

5. The electric door machine as claimed in claim 1, wherein said chain disk comprises a fixed seat and a sleeve, said sleeve being fixed in the holder to form said central circular bore, said plurality of fixed pins protrude from said fixed seat fitting on said wall disk.

6. The electric door machine as claimed in claim 1, further comprising a reduction mechanism connecting to said drive shaft of said electric motor to reduce the output rotation speed of said electric motor.

* * * * *